United States Patent [19]

Scranton, Jr.

[11] Patent Number: 6,126,911
[45] Date of Patent: Oct. 3, 2000

[54] METAL OXIDE PRODUCT SUITABLE FOR USE IN DEHYDRATED GAS

[75] Inventor: Delbert C. Scranton, Jr., Chesterfield, Mo.

[73] Assignee: The SulfaTreat Company, Chesterfield, Mo.

[21] Appl. No.: 08/873,315

[22] Filed: Jun. 11, 1997

Related U.S. Application Data

[63] Continuation-in-part of application No. 08/832,572, Apr. 2, 1997, Pat. No. 5,858,912, which is a continuation-in-part of application No. 08/518,645, Aug. 24, 1995, Pat. No. 5,632,931, which is a continuation-in-part of application No. 08/253,976, Jun. 3, 1994, abandoned, which is a continuation-in-part of application No. 08/069,073, May 28, 1993, Pat. No. 5,320,992, which is a continuation-in-part of application No. 07/878,031, May 4, 1992, Pat. No. 5,264,194.

[51] Int. Cl.[7] ............................ B01D 53/48; B01D 53/54
[52] U.S. Cl. ................... 423/230; 423/231; 423/242.4; 423/244.02; 423/244.06; 502/401; 502/406; 252/191
[58] Field of Search ..................... 423/230, 231, 423/242.4, 244.02, 244.06; 502/401, 406; 252/191, 189, 194

[56] References Cited

U.S. PATENT DOCUMENTS

| | | | |
|---|---|---|---|
| 2,181,433 | 11/1939 | Jordan | 423/231 |
| 4,366,131 | 12/1982 | Fox | 423/231 |
| 5,185,038 | 2/1993 | Kamegama | 106/416 |
| 5,320,992 | 6/1994 | Fox et al. | 502/84 |
| 5,632,931 | 5/1997 | Fox et al. | 502/80 |

FOREIGN PATENT DOCUMENTS

| | | |
|---|---|---|
| 1-199630 | 8/1989 | Japan . |
| 1301483 | 4/1987 | U.S.S.R. . |
| 91-03422 | 3/1991 | WIPO . |

*Primary Examiner*—Steven P. Griffin
*Assistant Examiner*—Peter DiMauro
*Attorney, Agent, or Firm*—Lathrop & Gage L.C.

[57] ABSTRACT

The present invention relates to the use of metal oxide particles held on carrier particles and moistened with a hygroscopic moistening agent, preferably glycol, with the moistened metal oxide particles used in a system designed to remove sulfur from dehydrated and water under-saturated gas compounds.

15 Claims, No Drawings

METAL OXIDE PRODUCT SUITABLE FOR USE IN DEHYDRATED GAS

CROSS-REFERENCE TO RELATED APPLICATIONS

This application is a continuation-in-part of application Ser. No. 08/832,572, filed Apr. 2, 1997, now U.S. Pat. No. 5,858,912, which is a continuation-in-part of application Ser. No. 08/518,645, filed Aug. 24, 1995, now U.S. Pat. No. 5,632,931, which was a continuation-in-part of application Ser. No. 08/253,976, filed Jun. 3, 1994, now abandoned, which was a continuation-in-part of application Ser. No. 08/069,073, filed May 28, 1993, now U.S. Pat. No. 5,320,992, issued Jun. 14, 1994, which is a continuation-in-part of application Ser. No. 07/878,031, filed May 4, 1992, now U.S. Pat. No. 5,264,194, issued Nov. 23, 1993.

FIELD OF INVENTION

The present invention relates to metal oxide compositions for removing sulfur compounds from dehydrated and water under-saturated gas, uses of the metal oxide compositions, and a method for making the metal oxide compositions. More specifically, the present invention relates to the use of glycols as moistening agents in metal oxide compositions used to treat dehydrated gas.

BACKGROUND OF THE INVENTION

Natural gas and liquefied petroleum gas are typically recovered by drilling wells in the crust of the earth, with the wells passing through water tables and moist rock. As the gas is pumped out of the earth it normally becomes saturated with water so that the gas may be saturated with as much as 100% water humidity. Because the gas contains so much water it is necessary to remove the water as it tends to freeze in the winter and is considered a contaminant of the gas. The removal of the water from the gas is typically achieved by passing the gas through a triethylene glycol system which removes nearly all of the water from the gas. In fact, generally, the water in the gas is reduced down to around 4 to 10 pounds of water per one million cubic feet of gas, which is considered dehydrated or water under-saturated. Also, gas having from around 4 to 10 pounds of water per one million cubic feet of gas is considered non-contaminated and acceptable for commercial use.

When gas is treated to remove sulfur it is normally passed through a reactor vessel containing iron oxide or other types of metal oxides, which react with and remove the sulfur from the gas. However, in order for the iron oxide to effectively react with and remove the sulfur from the gas, the iron oxide must be kept moist. If the iron oxide is allowed to dry out, sulfur removal will be ineffective and the period of time for removal may be too long. Water or non-aqueous liquids can be used to moisten the iron oxide. Water, however, is usually the liquid which is used to keep the iron oxide moist, in part because water increases the reactivity of the iron oxide. Additionally, water is usually added to the gas before it is passed through the iron oxide bed to keep the iron oxide bed from drying out and to maintain the high reactivity of the iron oxide bed. It should be noted that if the gas is dehydrated when it is passed into an iron oxide bed that has been moistened with water, the water will migrate into the gas changing the gas from dehydrated to hydrated. Consequently, under traditional sulfur removal systems, gas which passes through the sulfur removal process tends to become or remain hydrated with water.

As a result, once the sulfur has been removed from the gas it must further be treated to remove the water from the gas, which is disadvantageous because another step is added to the process. Also, typically an additional step is involved in moisturizing the gas prior to entry into the reactor vessel. The additional steps can be costly and time consuming.

As mentioned, non-aqueous solutions may be used to moisten the metal oxide composition; however, non-aqueous solutions, other than glycols or hygroscopic agents, suffer from some disadvantages. The non-aqueous solutions tend to evaporate quickly. Also, most of the non-aqueous solutions are not hygroscopic which means they do not readily attract water from the gas being treated.

Thus, as can be seen, the use of water to moisten metal oxide beds is disadvantageous. Because water is disadvantageous, it would be desirable to have a method and composition which could treat dehydrated gas so as to eliminate the gas moistening step prior to sulfur removal. It would further be desirable to have a composition and method which does not contribute substantial amounts of water to the gas being treated. Finally, it is desirable to have a method that eliminates the step of removing water from gas after the removal of the sulfur from the gas.

SUMMARY OF INVENTION

The present invention relates to a metal oxide composition which is moistened with a hygroscopic agent and used in removing sulfur from dehydrated or water under-saturated fluids and a method for making and using the metal oxide composition. Preferably, the dehydrated or water under-saturated fluid is a gas such as natural gas, butane, propane, liquid petroleum gas, nitrogen gas, as well as combinations thereof and other similar gas compounds. Any hygroscopic agent can be used to moisten the metal oxide composition as long as the hygroscopic agent is a liquid, increases the rate of reactivity of the metal oxide with sulfur compounds as compared to dehydrated metal oxide compositions, does not readily contaminate the gas being treated by the present process, and holds the iron oxide particles onto carriers in a reactor chamber.

The removal of water from a gas prior to sulfur removal is usually accomplished with a hygroscopic agent. The resulting treated gas has a reduced amount of water and often has some amount of the hygroscopic agent intermixed therewith. Because the hygroscopic agent tends to intermix with the gas it is important that the hygroscopic agent not be a contaminant that must be removed from the gas at a later time. Generally, triethylene glycol is a preferred hygroscopic agent used to remove water from the gas and is not considered a contaminant that must be removed at a later stage. As mentioned, metal oxides more effectively remove sulfur compounds located in the gas when the metal oxides are kept moist, as compared to dehydrated metal oxides. Hygroscopic agents can be used to moisten the metal oxide, thereby functioning similar to water by increasing the rate of reactivity of the metal oxide with sulfur compounds. However, hygroscopic agents are advantageous because, unlike water, they do not contaminate the gas being treated. Thus, the present invention is especially advantageous because it uses hygroscopic compounds, such as triethylene glycol, instead of water to moisten the metal oxide composition. Preferably the hygroscopic agent used to initially remove the water from the gas is used to moisten the metal oxide compounds.

The hygroscopic agent is preferred because, depending on the concentration of the water and hygroscopic agent in the gas and reactor vessel, the hygroscopic agent can remove water from the gas and maintain the gas in a dehydrated state. Also, the hygroscopic agent keeps the metal oxide particles moistened and causes the particles to remain held onto the carrier particles. Furthermore, the hygroscopic agent is preferred over other non-aqueous liquids because the hygroscopic agent can attract water, unlike many other non-aqueous liquids, with the water attracted by the hygroscopic agent further increasing the reactivity of the metal oxide. Consequently, the use of the hygroscopic agent can increase the reactivity of the metal oxides, as compared to metal oxides moistened only with non-aqueous liquids.

It is desirable, but not necessary, to add a small amount of water to the hygroscopic agent used to moisten the metal oxides. The water will increase the reactivity of the metal oxides and lower the viscosity of the hygroscopic agent making it easier to mix with the metal oxides. If water is added to the hygroscopic agent, the amount added should be roughly equivalent to the percentage of water present in the gas, otherwise the water will migrate from the metal oxide composition into the gas being treated. Migration of the water into the gas is an undesirable result because it is desired to maintain the dehydrated character of the gas. It is most preferable if the amount of water present in the hygroscopic solution is less than the percentage of water present in the gas, because this may attract water from the gas which can further increase the reactivity of the metal oxide moistened with the hygroscopic solution and further reduce the amount of water present in the gas. As a result of the water attracting character of the hygroscopic solution used to moisten the metal oxide particles, the present invention can be used with water saturated gas so long as the percentage of water in the moistening agent is less than the percentage of water in the gas. Thus, if a hygroscopic solution is formed, the amount of water added to the hygroscopic solution should approximately equal or be less than the percentage of water found in the gas being treated and the water in the hygroscopic solution should not migrate from the solution to the gas.

The use of the hygroscopic solution, especially triethylene glycol, is desirable because it moistens the metal oxide, does not readily volatize into the gas, may attract water from the gas, and, most importantly, allows for the treatment of dehydrated gas without contributing further contaminants to the gas which must later be removed by another process.

SPECIFICATION

In accordance with the present invention a composition is provided for removing sulfur compounds from dehydrated or water under-saturated gas with the composition containing a metal oxide and an amount of moistening agent, and a method for using and making the composition. Specifically, the present invention relates to a metal oxide bed composition comprised of carrier particles, metal oxide particles, and a hygroscopic moistening agent, wherein the composition is placed in a reaction vessel and has an amount of dehydrated gas passed therethrough so as to remove sulfur compounds from the dehydrated gas. The hygroscopic moistening agent used in the present invention is especially important as it allows the composition to readily remove sulfur from the gas without contributing water or other contaminants to the treated gas. Preferably, the hygroscopic moistening agent is a glycol or high molecular weight alcohol, with the moistening agent potentially containing an amount of water. It is especially important to note that the present invention primarily relates to the use of glycol as a moistening agent in a composition designed to treat dehydrated or water under-saturated gas. However, the present invention can also be used to treat other gases which are not dehydrated.

The composition used in the process to treat dehydrated gas is comprised of carrier particles, moistening agents, and oxide particles, with the formation of the composition initiated by first selecting an inert carrier that can be used in the dehydrated gas treatment process. A suitable inert carrier can be selected from a variety of materials so long as the carrier particles are porous, non-soluble in the moistening agent, readily wetted, and non-reactive with sulfur compounds. Additionally, it is necessary for the carrier particles to be disposed to binding with oxide particles when a moistening agent is added thereto. While a variety of compositions can be used, the most preferred carrier particles are derived from clay and are preferably selected from the group consisting of calcined montmorillonite, bloated shale or slate, and combinations of calcined montmorillonite and bloated shale. The calcined montmorillonite is especially preferred because it is porous, has a strong texture, and has adequate surface area to which the oxide particles may cling. It is necessary that the carrier particles have sufficient surface area and porosity so that the oxide particles can be dispersed over the surface of the carrier particles and be prevented from clumping. Also, the calcined montmorillonite is desirable because it is substantially insoluble in hygroscopic liquids and has the capacity to absorb a sufficient amount of hygroscopic moistening agent to disperse and hold on its surface an amount of metal oxide particles equal to from about 5% to about 40% of the total weight of the packed bed composition. It is more preferred for the calcined montmorillonite to hold an amount of metal oxide particles equal to from about 10% to about 25% of the total weight of the packed bed composition. However, the amount of metal oxide particles held by and added to the carrier particles can be varied based on the reactivity of the metal oxide particles. Another attribute of the calcined montmorillonite is that it possesses the necessary strength to be used in a packed bed process. Also, the calcined montmorillonite is generally chemically inert to sulfur compounds, including hydrogen sulfide, mercaptans, and the products of reaction thereof.

The amount of carrier particles used in the packed bed process is dependent upon the size and depth of the reactor vessel designed to hold the packed bed composition. Any amount of carrier particles can be added to the reactor vessel so long as the moistened carrier particles are not crushed by their own weight and the gas has the sulfur adequately removed or is adequately sweetened. Generally, the amount of carrier particles will be equal to between about 40% and about 85% by weight of the weight of the total composition. If the montmorillonite is used it will typically have a dry weight ranging between about 35 pounds and about 45 pounds per cubic foot of material. When this is the case, the moistened montmorillonite carrier particles intermixed with the metal oxide particles can be added to a reactor vessel, without crushing the mixed composition, in an amount well over five feet deep and, it appears as much as 40 feet deep.

The metal oxide particles are added to the carrier particles typically after the moistening agent has been added to the carrier particles. The oxide particles can be added at any point after the time when the metal oxide particles will begin to stick to the carrier particles as a result of the addition of the moistening agent. The amount of metal oxide particles added to the moistened carrier particles will equal between about 5% and about 40% by weight of the packed bed composition. Also, a sufficient amount of metal oxide must be added so that the amount of metal oxide clinging to the carrier particles appears to be equal to at least 6 pounds of oxide particles per cubic foot of carrier particles and probably at least 15 pounds of oxide particles per cubic foot of the calcined and wetted carrier particles. Preferably, the quantity of metal oxide particles added in the mixing chamber will equal about 15 pounds of oxide particles per cubic foot of carrier particles, but in shallow beds the oxide quantity may be as great as 35 pounds of metal oxide particles per cubic foot of carrier particles. Metal oxide particles, preferably iron oxide particles, are added to the composition because the metal oxide particles react with sulfur compounds found in gas and result in the removal of the sulfur compounds from the gas. The iron oxide particles are typically used because of their high rate of reactivity with sulfur compounds. Other metal oxide particles can be used including row or period four (4) metal oxides and group 10, 11, and 12 metal oxides. The most preferred metal oxide particles are selected from the group consisting of iron oxide particles, which includes, but is not limited to, amorphous iron oxide $Fe_2O_3$, crystalline phase iron oxide $Fe_3O_4$, hydrated ferric oxide $Fe_2O_3(H_2O)_x$, and combinations thereof. Generally, the metal oxide particles will have a particle size equal to or less than 150 microns.

The choice of moistening agent is important when the metal oxide composition is used to remove sulfur from dehydrated or substantially water under-saturated gas. The moistening agent is necessary because the metal oxide particles must be kept moist in order to adequately react with the sulfur found in the gas. If the metal oxide is allowed to dry out or is not kept moist, as will be shown below, the removal of the sulfur from the gas will be inadequate because the metal oxide will not have a high enough reactivity with the sulfur compounds. Not only is the moistening agent necessary to promote the reactivity in the metal oxide, but the moistening agent is necessary to allow the metal oxide particles to be held onto the carrier particles. Consequently, in order to have a metal oxide that adequately removes sulfur from gas the moistening agent must be included with the metal oxide composition.

A desirable moistening agent will be hygroscopic, will not substantially migrate into the gas being treated, and will promote the reactivity of the metal oxide. Hygroscopic characteristics in the moistening agent are important because they can result in the moistening agent pulling water out of the gas, with the water increasing the reactivity of the metal oxide composition. Also, the hygroscopic agent will not contribute significant amounts of water or moisture to the gas being treated, thus the gas will advantageously remain dehydrated thereby preventing further treatment to remove water after the removal of sulfur.

The hygroscopic moistening agent is added to the metal oxide composition in an amount equal to from about 5% to about 35% by weight of the metal oxide composition. More preferably, the moistening agent is added to the metal oxide composition in an amount equal to from about 5% to about 25% by weight of the metal oxide composition. The moistening agent can be any hygroscopic liquid which will not readily volatize into the gas being treated by the metal oxide composition and which keeps the metal oxide moistened and reactive for sustained periods of time. The hygroscopic moistening agent can be selected for the group consisting of glycols, olefins, and alcohols, with glycol being the preferred moistening agent. The glycol is selected from the group consisting of triethylene glycol, polypropylene glycol, and propylene glycol. The most preferred hygroscopic moistening agent is triethylene glycol.

It is further preferred, but not required, to add a small amount of water to the glycol to form a glycol solution moistening agent. The water is added to increase the reactivity of the metal oxide composition and to reduce the viscosity of the glycol to promote mixing of the glycol with the metal oxide. The amount of water added to the glycol should not be greater than the percentage of water by weight found in the gas being treated. If the percentage of water added to the glycol is substantially greater than the percentage of water by weight present in the gas, some of the water will likely migrate into the gas being treated. Migration of water into the gas is an unwanted result because the gas may then have to be treated at a later time to remove the water. To prevent the water from migrating to the gas, the glycol and water are mixed together in a range of from about 2 parts by weight to about 20 parts by weight of glycol to about 1 part by weight of water. Most preferably the glycol to water ratio is about 8 parts by weight of glycol to about 1 part by weight of water.

The metal oxide composition may additionally have an activator added to the composition to promote increased reactivity between the metal oxide and the sulfur compounds found in gas. The activator can be added to the metal oxide composition in an amount equal to from about 0.125% to about 5.0% by weight of the metal oxide composition. The activator can be selected from a variety of metal oxides which increase the electropotential of the metal oxide and have a higher electropotential than the metal oxide; however, it is preferred to use a copper oxide as the activator.

The gas treated by the metal oxide composition can be a variety of fluids, however, the present invention is preferably designed to treat dehydrated or water under-saturated gas. Typically, the gas treated by the present metal oxide composition is dehydrated or water under-saturated natural gas and related compounds and liquefied petroleum gas and related compounds. The natural gas compounds are selected from the group consisting of natural gas, propane, butane, and combinations thereof. Generally, the dehydrated gas will have from about 4 to about 10 pounds of water per one million cubic feet of gas.

The most preferred metal oxide composition is comprised of montmorillonite carrier particles added in an amount ranging between about 40% and about 85% by weight of the metal oxide composition, iron oxide particles added in amount ranging about 5% and about 30% parts by weight by weight of the metal oxide composition, and triethylene glycol added in amount ranging between about 5% and about 35% by weight of the metal oxide composition.

The metal oxide product can be prepared by first forming the moistening agent, such as the hygroscopic solution which is preferably comprised of triethylene glycol and water. Once the hygroscopic solution is prepared it is mixed with the metal oxide particles, preferably iron oxide, and then the mixture of the hygroscopic solution and the metal oxide particles are mixed with the carrier particles. Alternatively, the moistening agent can be mixed with the carrier particles and then the metal oxide particles can be added to the moistened carrier particles. After the constituents are mixed they are placed in a reactor vessel which will receive untreated gas containing sulfur. The untreated gas enters the reactor vessel on one end and passes through the moistened metal oxide particles held on the carrier particles. The gas that passes through the metal oxide particles will have at least 50% by weight of the sulfur found in the untreated gas removed and will preferably exit the reactor vessel in a dehydrated or water under-saturated state. However, the gas may exit the reactor vessel with less sulfur and a lesser amount of water.

The sulfur compounds which react with the metal oxide and which are removed from the gas, included, but are not limited to, mercaptans and sulfides, including hydrogen sulfide.

The following examples are illustrative only and do not limit the scope of the present invention.

EXAMPLE 1

To test the effectiveness of glycol, specifically triethylene glycol, as a moistening agent, as compared to a composition made without a moistening agent or which uses other moistening agents, four test compositions were prepared as follows:

| Composition 1 | Composition 2 | Composition 3 | Composition 4 |
|---|---|---|---|
| 5.92 lbs. inert carrier | 6.5 lbs. iron oxide powder | 5.92 lbs. inert carrier | 2.8 lbs. inert carrier |
| 1.62 lbs. triethylene glycol | 3.5 lbs. inert carrier | 1.62 lbs. triethylene glycol | 2.1 lbs. iron oxide powder |
| 0.22 lbs. water | | 0.22 lbs. water | 2.1 lbs. water |
| 2.17 lbs. iron oxide powder | | 2.24 lbs. iron oxide powder | |
| 0.07 lbs. copper oxide powder | | | |

The four compositions each weighed ten (10) pounds, with Composition 1 containing the combination of triethylene glycol (TEG) and an activator, Composition 2 being a non-moistened composition, Composition 3 was formed to demonstrate the effectiveness of a composition which uses TEG alone as a moistener, and Composition 4 was made to compare compositions moistened with water to compositions moistened with TEG with Composition 4 using water as a moistening agent. The effectiveness of each of the compositions was determined by the amount of sulfur removed by one foot of composition. The more sulfur removed the more effective the composition was considered.

To test the effectiveness, each of the four (4) compositions were placed in a separate sealed glass test column having an inner diameter of 1.89 inches and a height of 7.2 feet. The column and the composition contained therein were maintained at a temperature of 70° F. There was an internal pressure of 25 psig in the column. Nitrogen gas containing from about 450 to about 500 parts per million of hydrogen sulfide was then passed through the column at a flow rate of 7.85 liters per minute.

A reading for each of the compositions was taken from a port located in the test column approximately one (1) foot from where the nitrogen gas entered the test column. After the gas had passed through one (1) foot of the material packed in the column the nitrogen gas was examined to determine how much $H_2S$ remained in the nitrogen gas. The results of passing the nitrogen gas containing sulfur through each of the sample compositions were as follows:

| Composition 1 | Composition 2 | Composition 3 | Composition 4 |
|---|---|---|---|
| 165 ppm* | 350 ppm* | 250 ppm* | 200 ppm* |

$H_2S$ after passage through one (1) foot of reactive material.

As can be seen, the best sulfur removal results were achieved with Composition 1, which included an activator mixed with triethylene glycol. A comparison between iron oxide moistened with water and iron oxide moistened with TEG shows that the composition which uses water as a moistening agent more readily removes sulfur than the composition which uses triethylene glycol as a moistening agent. Importantly, Composition 3 shows that the TEG used alone as a moistening agent is sufficient to promote reactivity between sulfur compounds and iron oxide. Composition 4 shows that if a moistening agent is not used the sulfur removal characteristics of the iron oxide are greatly decreased.

Thus, there has been shown and described a novel method and composition for moistening oxides reactant with sulfur compounds to remove sulfur compounds from gases which fulfill all the objects and advantages sought therefore. It would be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A metal oxide composition for scavenging sulfur compounds from dehydrated and water under-saturated gas compounds, comprising natural gas compounds and liquified petroleum gas compounds, wherein said composition is comprised of:
   (a) an amount of inert carrier particles equal to from about 40% to about 85% parts by weight of said composition;
   (b) an amount of metal oxide particles equal to from about 5% to about 40% parts by weight of said composition, with said metal oxide particles having a size equal to or less than 150 microns; and,
   (c) an amount of moistening agent solution added to said composition in an amount equal to from about 5% to about 35% by weight of said composition with said solution comprised of water and glycol, wherein said glycol is added to said solution in an amount ranging between about 2 parts by weight to about 20 parts by weight of said glycol to about 1 part by weight of said water.

2. The metal oxide composition of claim 1 wherein said glycol is selected from the group consisting of triethylene glycol, polypropylene glycol, and propylene glycol.

3. The metal oxide composition of claim 1 wherein said metal oxide is selected from the group consisting of iron oxides.

4. The metal oxide composition of claim 1 wherein said composition includes an amount of activator equal to from about 0.125% to about 5.0% by weight of said composition.

5. The metal oxide composition of claim 4 wherein said activator is a copper oxide.

6. The metal oxide composition of claim 1 wherein said glycol is added to said solution in an amount equal to about 8 parts by weight of glycol to about 1 part by weight of water.

7. A method for removing sulfur compounds from dehydrated and water under-saturated gases comprising:
   (a) forming a hygroscopic moistening agent solution by combining in a mixer an amount of glycol with an amount of water, wherein said glycol is added to said solution in an amount equal to from about 2 parts to about 20 parts by weight of said glycol to about 1 part by weight of said water;

(b) forming a metal oxide composition by placing in a reactor vessel an amount of inert carrier particles equal to from about 40% to about 85% parts by weight of said composition, an amount of metal oxide particles equal to from about 5% to about 40% parts by weight of said composition, and an amount of said moistening agent solution equal to from about 5% to about 35% parts by weight of said composition;

(c) attaching a gas source to said reactor so as to allow said reactor to receive and treat an amount of gas emanating from the gas source, wherein the gas is selected from the group consisting of dehydrated or water under-saturated natural gas and liquefied petroleum gas; and, (d) passing the gas through said reactor so that upon passage of the gas through said reactor the gas has had at least 50% of the sulfur found in the gas removed by said method for removing gas and the gas remains dehydrated or water under-saturated.

8. The method of claim 7 wherein said glycol is selected from the group consisting of triethylene glycol, polypropylene glycol, and propylene glycol.

9. The method of claim 7 wherein said metal oxide is selected from the group consisting of iron oxides.

10. The method of claim 7 wherein said glycol is added to said solution in an amount equal to about 8 parts by weight of glycol to about 1 part by weight of water.

11. The method of claim 7 wherein said composition further includes an amount of activator equal to from about 0.125% to about 5.0% by weight of said composition.

12. A method for making a metal oxide composition for scavenging sulfur from dehydrated and water under-saturated gas comprising the steps of:

a) selecting an amount of inert carrier particles equal to from about 40% to about 85% parts by weight of said metal oxide composition;

b) selecting an amount of metal oxide particles equal to from about 5% to about 40% parts by weight of said metal oxide composition;

c) forming an amount of hygroscopic moistening agent solution wherein said moistening agent is comprised of an amount of glycol equal to between about 2 parts and about 20 parts by weight added to an amount of water equal to about 1 part by weight;

d) mixing said metal oxide particles and said carrier particles with an amount of said hygroscopic moistening agent equal to between about 5% and about 35% parts by weight of said metal oxide composition; and, e) placing said metal oxide composition in a reactor vessel so as to receive and sweeten dehydrated and water under-saturated gas.

13. The method of claim 12 wherein said glycol is selected from the group consisting of triethylene glycol, polypropylene glycol, and propylene glycol.

14. The method of claim 12 wherein said metal oxide is selected from the group consisting of iron oxides and zinc oxides.

15. A metal oxide composition for scavenging sulfur compounds from dehydrated and water under-saturated gas compounds, comprising natural gas compounds and liquefied petroleum gas compounds, wherein said composition comprises:

(a) an amount of inert carrier particles equal to from about 40% to about 85% parts by weight of said composition;

(b) an amount of metal oxide particles equal to from about 5% to about 40% parts by weight of said composition, with said metal oxide particles having a size equal to or less than 150 microns;

(c) an amount of moistening agent solution added to said composition in an amount equal to from about 5% to about 35% by weight of said composition with said solution comprised of water and glycol, wherein said glycol is added to said solution in an amount ranging between about 2 parts by weight to about 20 parts by weight of said glycol to about 1 part by weight of said water; and, (d) an amount of a copper oxide activator equal to from about 0.125% to about 5.0% by weight of said composition.

* * * * *